United States Patent
Tominaga et al.

(10) Patent No.: US 12,423,897 B2
(45) Date of Patent: Sep. 23, 2025

(54) INFORMATION PROCESSING DEVICE, INFORMATION PROCESSING METHOD, AND PROGRAM

(71) Applicant: Sony Group Corporation, Tokyo (JP)

(72) Inventors: Kanna Tominaga, Tokyo (JP); Shuhei Miyazaki, Tokyo (JP); Hiromi Fukaya, Tokyo (JP); Takeshi Matsui, Tokyo (JP); Masayuki Sagano, Tokyo (JP); Saki Nishihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/699,310

(22) PCT Filed: Oct. 6, 2022

(86) PCT No.: PCT/JP2022/037498
§ 371 (c)(1),
(2) Date: Apr. 8, 2024

(87) PCT Pub. No.: WO2023/068067
PCT Pub. Date: Apr. 27, 2023

(65) Prior Publication Data
US 2024/0404158 A1    Dec. 5, 2024

(30) Foreign Application Priority Data

Oct. 18, 2021   (JP) ................. 2021-170366

(51) Int. Cl.
*G06T 13/40* (2011.01)
*G06T 13/20* (2011.01)
(Continued)

(52) U.S. Cl.
CPC ............ *G06T 13/205* (2013.01); *G06T 13/40* (2013.01); *G06T 19/00* (2013.01); *G10L 25/57* (2013.01); *G10L 25/63* (2013.01)

(58) Field of Classification Search
CPC ....... G06T 13/205; G06T 13/40; G06T 19/00; G10L 25/57; G10L 25/63; G10L 21/10; G06F 3/167; G06F 3/16; G06F 40/279
See application file for complete search history.

(56) References Cited

U.S. PATENT DOCUMENTS 10,074,059 B1 *   9/2018   Albro ............. G06Q 10/063116
11,461,952 B1 *  10/2022   Bosnak ................ G06V 40/176
(Continued)

FOREIGN PATENT DOCUMENTS

| JP | 2010-533006 A | 10/2010 |
|----|---------------|---------|
| KR | 20040014123 A | 2/2004 |
| WO | 2017/175351 A1 | 10/2017 |

OTHER PUBLICATIONS

International Search Report and Written Opinion mailed on Dec. 27, 2022, received for PCT Application PCT/JP2022/037498, filed on Oct. 6, 2022, 10 pages including English Translation.

*Primary Examiner* — Towfiq Elahi
(74) *Attorney, Agent, or Firm* — XSENSUS LLP

(57) ABSTRACT

An information processing device includes an emotion recognition unit, a facial expression output unit, and an avatar composition unit. The emotion recognition unit recognizes an emotion on the basis of a speech waveform. The facial expression output unit outputs a facial expression corresponding to the emotion. The avatar composition unit composes an avatar showing the output facial expression.

12 Claims, 11 Drawing Sheets

(51) Int. Cl.
*G06T 19/00* (2011.01)
*G10L 25/57* (2013.01)
*G10L 25/63* (2013.01)

(56) References Cited

U.S. PATENT DOCUMENTS

| | | | |
|---|---|---|---|
| 2007/0188502 A1* | 8/2007 | Bishop | H04L 12/1827 |
| | | | 345/473 |
| 2010/0306685 A1* | 12/2010 | Giaimo, III | A63F 13/67 |
| | | | 715/765 |
| 2011/0115798 A1* | 5/2011 | Nayar | G06T 13/40 |
| | | | 345/473 |
| 2011/0296324 A1* | 12/2011 | Goossens | G06Q 50/01 |
| | | | 715/763 |
| 2015/0287403 A1 | 10/2015 | Holzer Zaslansky | |
| 2016/0132291 A1* | 5/2016 | Bai | G10L 15/22 |
| | | | 715/728 |
| 2016/0378961 A1 | 12/2016 | Park | |
| 2017/0132828 A1* | 5/2017 | Zelenin | A63F 13/63 |
| 2020/0090393 A1 | 3/2020 | Shin | |
| 2020/0162799 A1 | 5/2020 | Merler et al. | |
| 2020/0410739 A1* | 12/2020 | Shin | G06V 10/764 |
| 2021/0142782 A1 | 5/2021 | Wolf et al. | |
| 2021/0295578 A1 | 9/2021 | Lee | |

* cited by examiner

INFORMATION PROCESSING DEVICE, INFORMATION PROCESSING METHOD, AND PROGRAM

CROSS-REFERENCE TO RELATED APPLICATIONS

The present application is based on PCT filing PCT/JP2022/037498, filed Oct. 6, 2022, which claims priority to Japanese Patent Application No. 2021-170366, filed Oct. 18, 2021, the entire contents of each are incorporated herein by reference.

FIELD

The present invention relates to an information processing device, an information processing method, and a program.

BACKGROUND

Non-verbal information such as facial expression, a complexion, gesture, and hand gesture plays a large role in achieving smooth communication. The same applies to communication using an avatar. An app for generating an avatar is installed in a smartphone. In this type of app, an avatar is generated on the basis of information acquired by motion capturing.

CITATION LIST

Patent Literature

Patent Literature 1: WO 2017/175351 A

SUMMARY

Technical Problem

A facial expression of an avatar is generated by imitation of a facial expression of a user. In normal communication, the facial expression of the user does not often change greatly. What appears as a change in the facial expression is, at most, a slight change such as movement of a line of sight or a direction of a face. Thus, it is difficult to cause the avatar to express rich emotions.

Thus, the present disclosure proposes an information processing device, an information processing method, and a program capable of causing an avatar to express rich emotions.

Solution to Problem

According to the present disclosure, an information processing device is provided that comprises: an emotion recognition unit that recognizes an emotion on a basis of a speech waveform; a facial expression output unit that outputs a facial expression corresponding to the emotion; and an avatar composition unit that composes an avatar showing the facial expression. According to the present disclosure, an information processing method in which an information process of the information processing device is executed by a computer, and a program for causing a compute to execute the information process of the information processing device are provided.

DESCRIPTION OF EMBODIMENTS

In the following, embodiments of the present disclosure will be described in detail on the basis of the drawings. In each of the following embodiments, overlapped description is omitted by assignment of the same reference sign to the same parts.

Note that the description will be made in the following order.

[1. Outline of a communication support service]
[2. Configuration of an information processing device]
[3. Speech recognition processing]
[3-1. Emotion/action recognition]
[3-2. Facial expression/action output]
[4. Character setting]
[5. Background setting]
[6. System configuration example]
[7. Hardware configuration example]
[8. Effect]

[1. Outline of a Communication Support Service]

Figure 1:
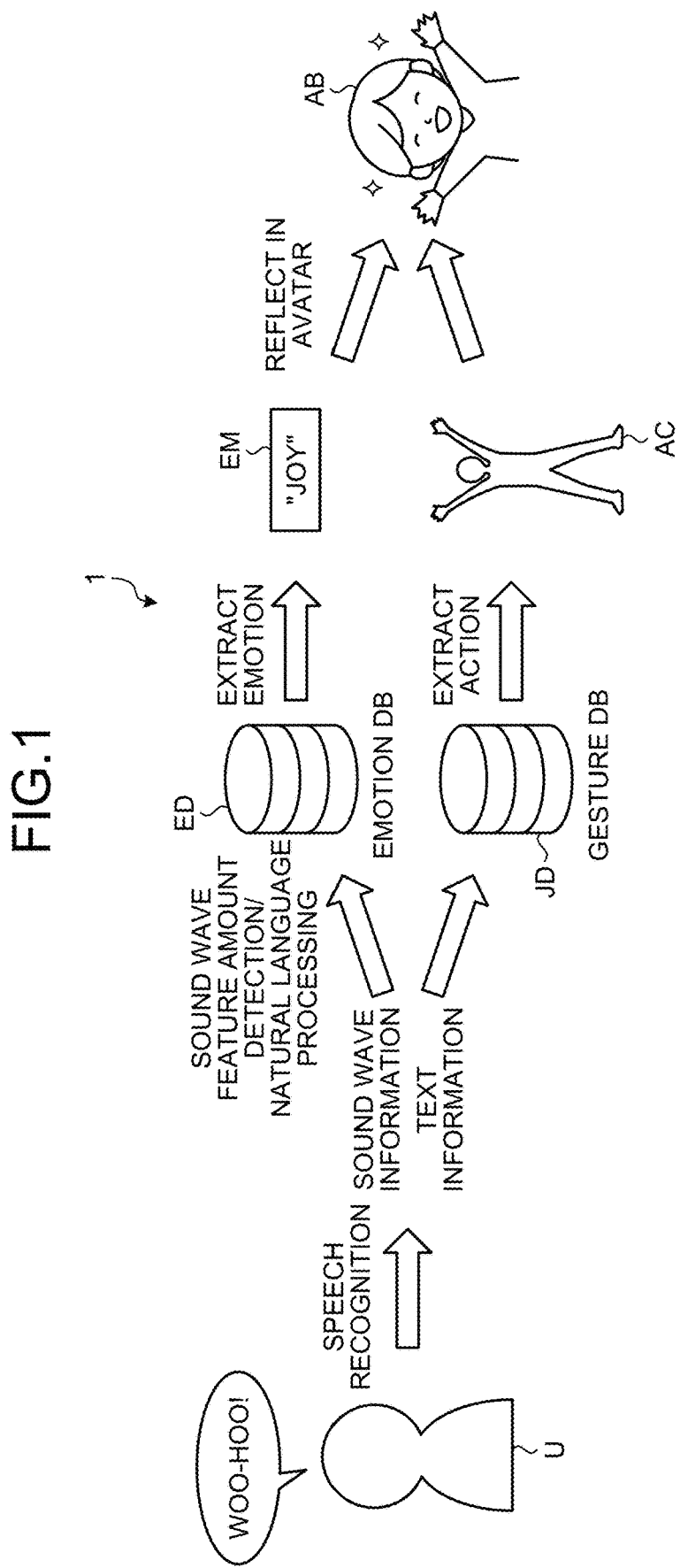
FIG. 1 is a view illustrating an example of a communication support service.

FIG. 1 is a view illustrating an example of the communication support service.

The communication support service is a service that supports communication between users U using an avatar AB. A facial expression and action of the avatar AB are controlled on the basis of an emotion EM and an excitement degree (magnitude of excitement of the emotion EM) of the user U, which are acquired by speech recognition. As compared with a case where the facial expression and action of the avatar AB are generated by utilization of motion capturing, it is possible to express richer emotions. Thus, it is possible to better convey various kinds of information difficult to be conveyed only by words to the other party. The communication support service is applied to one-way and two-way communication.

The communication support service is implemented by an information processing device 1 as illustrated in FIG. 1. The information processing device 1 extracts sound wave information related to a speech waveform SD (see FIG. 8) and text information related to uttered contents from speech data SG (see FIG. 10) by using a speech recognition technology.

The information processing device 1 applies a sound wave feature amount extracted from the speech waveform SD to an emotion database ED and estimates an emotion EM of the user U. The information processing device 1 determines an excitement degree at the time of utterance on the basis of the speech waveform SD and uttered contents. The information processing device 1 adjusts a facial expression indicating the emotion EM according to the excitement degree. The information processing device 1 determines the adjusted facial expression as the facial expression of the avatar AB.

The information processing device 1 collates the uttered contents with a gesture database JD, and estimates which gesture the user U performs at the time of the utterance. The information processing device 1 applies a gesture associated with the uttered contents to an action database AD (see FIG. 2) together with the excitement degree. As a result, the information processing device 1 estimates an action AC in consideration of the excitement degree. The information processing device 1 controls a facial expression and an action of the avatar AB on the basis of the estimated expression and action AC of the user U.

In the example of FIG. 1, speech "woo-hoo!" is detected on a terminal of the user U. By using a known speech recognition technology, the information processing device 1 extracts the speech waveform SD and the text information "woo-hoo!" from the speech data SG acquired from the terminal of the user U.

The information processing device 1 extracts the emotion EM indicating joy from the speech waveform and determines the excitement degree as "high". The information processing device 1 determines, as the facial expression of the avatar AB, a facial expression of joy in which positions of corners of a mouth or the like are adjusted according to the excitement degree. Furthermore, from the uttered contents "woo-hoo!", the information processing device 1 estimates a scene in which the user U is happy, and doing a fist pump or cheering, for example. The information processing device 1 selects a pose of cheering according to the excitement degree, and outputs the pose as the action AC of the avatar AB.

Note that the avatar AB is not necessarily a human. A dog, a cat, or the like can also be used as a character of the avatar AB. In this case, a way of making a facial expression, and a body motion (action AC) for making a gesture vary depending on a type of the character (such as a person, a dog, or a cat). The information processing device 1 includes a facial expression database FD and an action database AD that vary depending on a type of the character.

[2. Configuration of an Information Processing Device]

Figure 2:
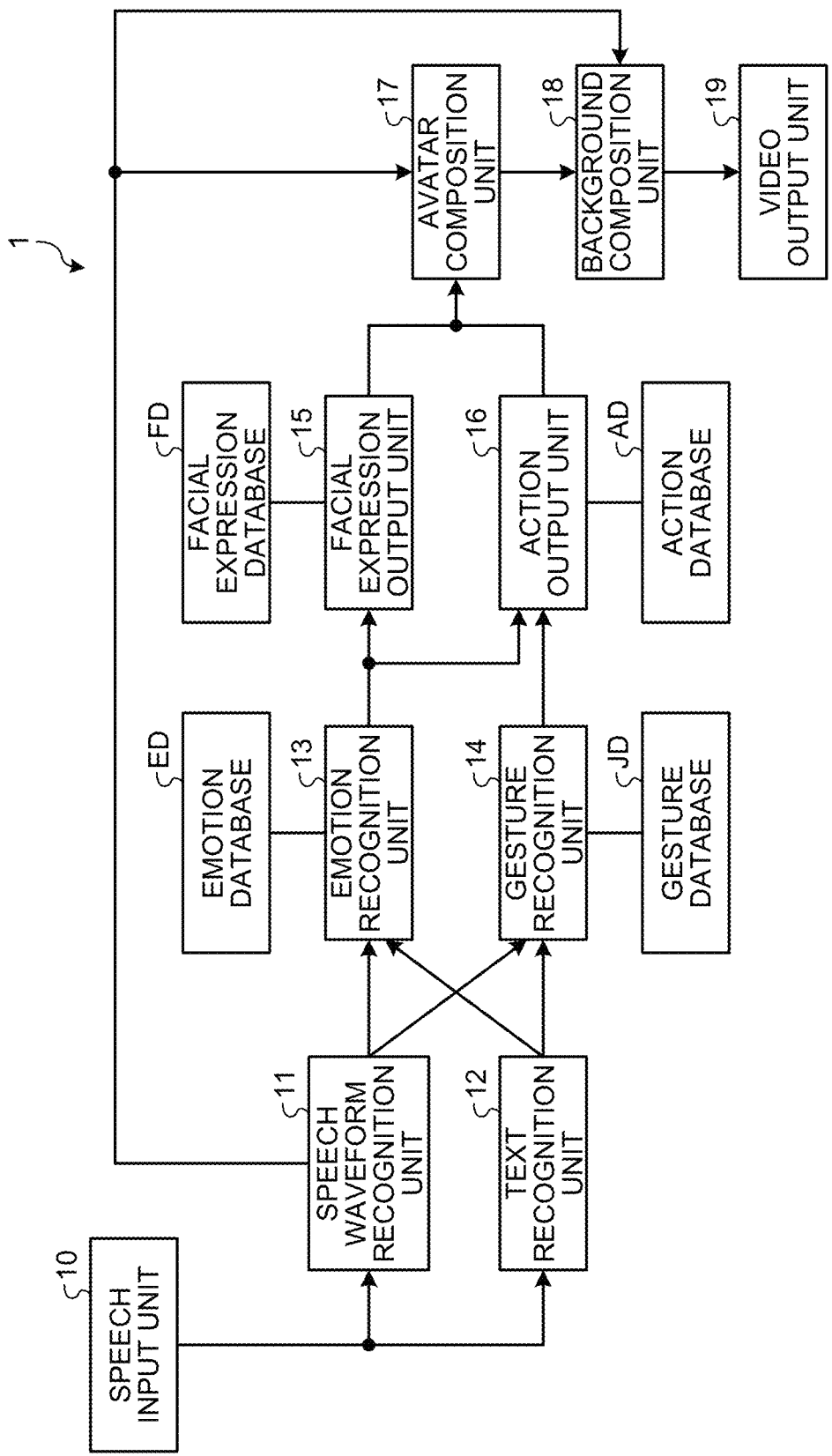
FIG. 2 is a block diagram illustrating an example of a functional configuration of an information processing device.

FIG. 2 is a block diagram illustrating an example of a functional configuration of the information processing device 1.

The information processing device 1 includes a speech input unit 10, a speech waveform recognition unit 11, a text recognition unit 12, an emotion recognition unit 13, a gesture recognition unit 14, a facial expression output unit 15, an action output unit 16, an avatar composition unit 17, a background composition unit 18, and a video output unit 19.

The speech input unit 10 outputs the speech data SG acquired from the terminal of the user U to the speech waveform recognition unit 11 and the text recognition unit 12. The speech waveform recognition unit 11 extracts the speech waveform SD (sound wave information) from the speech data SG. The text recognition unit 12 extracts the text information (uttered contents) from the speech data SG. The text information is extracted by utilization of the known speech recognition technology.

The emotion recognition unit 13 recognizes the emotion and the excitement degree of the user U on the basis of the speech waveform SD and the uttered contents. The emotion and the excitement degree are estimated mainly on the basis of the speech waveform SD (such as a tone or volume of voice). The excitement degree can also be estimated by unique wording uttered at the time of excitement, an appearance state of words, and the like. The emotion recognition unit 13 detects the emotion and the excitement degree by collating various features extracted from the speech waveform SD and the uttered contents with the emotion database ED.

The gesture recognition unit 14 recognizes a gesture on the basis of the uttered contents. The gesture includes an unconscious gesture, and a conscious gesture that is in conjunction with the utterance. For example, a motion of doing a fist pump when feeling joy or of breaking down and crying when feeling sad is the unconscious gesture. An action of eating a rice ball in conjunction with utterance "I will eat a rice ball from now" is the conscious gesture. In the gesture database JD, correspondence relation between the uttered contents and gestures is defined. The gesture recognition unit 14 collates the uttered contents with the gesture database JD and estimates the gesture of the user U at the time of the utterance.

The facial expression output unit 15 outputs a facial expression corresponding to the emotion EM. Human beings have emotions such as pleasure, disgust, sadness, fear, and anger. A standard facial expression is assigned to each emotion. For example, a facial expression of raising cheeks, lowering eyebrows or eyelids, and making wrinkles under eyes is assigned to pleasure. A facial expression of protruding an upper lip, lowering the eyebrows, and spreading wrinkles from under nostrils to both ends of the lips is assigned to disgust. A facial expression of directing a gaze downward and dropping upper eyelids is assigned to sadness. A facial expression of raising upper eyelids, lowering a chin, and opening a mouth is assigned to fear. A facial expression of making eyebrows close to each other and opening eyes widely is assigned to anger.

The facial expression output unit 15 adjusts a standard facial expression assigned to the emotion EM according to the excitement degree. For example, in a case where strong excitement is detected with respect to the emotion EM of pleasure, the facial expression output unit 15 adjusts the degree of raising the cheeks, the degree of lowering the eyebrows and the eyelids, the degree of rising the mouth corners, and the like. In a case where a strong excitement degree is detected with respect to the emotion EM of sadness, the facial expression output unit 15 outputs a facial expression of opening the mouth and grieving. The relationship between the emotion, the excitement degree, and the facial expression is defined in the facial expression database FD. The facial expression output unit 15 collates the emotion EM and the excitement degree with the facial expression database FD, and outputs the facial expression reflecting the emotion EM and the excitement degree.

The action output unit 16 outputs the action AC of the avatar AB which action corresponds to the gesture. According to the excitement degree, the action output unit 16 adjusts a standard action AC corresponding to the gesture. For example, in a case where a strong excitement degree with respect to the emotion EM of sadness (strong sadness) is detected, the action output unit 16 outputs the action AC of sinking to knees and drooping. The relationship between the gesture, the excitement degree, and the action AC is defined in the action database AD. The action output unit 16 collates the gesture and the excitement degree with the action database AD, and outputs the action AC reflecting the gesture and the excitement degree.

The avatar composition unit 17 acquires 3D data of the character for the avatar AB. The character may be manually selected on the basis of the user input information, or may be automatically selected on the basis of the speech data SG. By using the 3D data of the character, the avatar composition unit 17 composes the avatar AB indicating the facial expression and the action AC acquired from the facial expression output unit 15 and the action output unit 16.

The background composition unit 18 composes the background BG (see FIG. 9) corresponding to a scene estimated on the basis of the speech waveform SD and the uttered contents. For example, the background BG of rain is set on the basis of a rain sound (speech waveform SD). The background BG of an Italian city is set on the basis of the uttered contents "I went to a trip to Italy".

The video output unit 19 outputs a video VD (see FIG. 10) including the avatar AB and the background BG. On the basis of mute setting, the video output unit 19 determines whether to include the speech data SG acquired by the speech input unit 10 in the video VD. In a case where the mute setting is OFF, the video output unit 19 performs the output with the speech data SG, from which the speech waveform SD is extracted, being included in the video VD. In a case where the mute setting is ON, the video output unit 19 outputs the video VD not including the speech data SG.

[3. Speech Recognition Processing]

[3-1. Emotion/Action Recognition]

Figure 3:
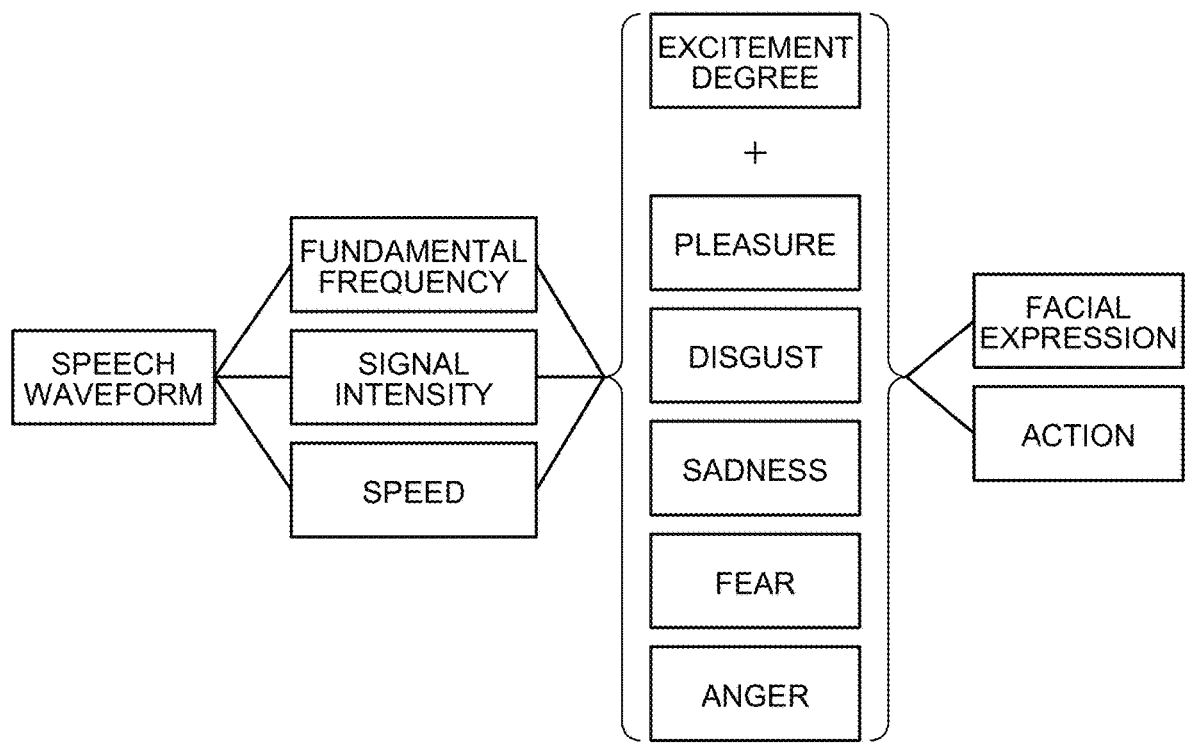
FIG. 3 is a view illustrating an example of an emotion recognition method.

FIG. 3 is a view illustrating an example of an emotion recognition method.

The emotion recognition unit 13 recognizes the emotion EM on the basis of the speech waveform SD. For example, the emotion recognition unit 13 determines a fundamental frequency (tone of voice), a volume of the speech, and a speed and a switching pause of the utterance as speech parameters. The emotion recognition unit 13 extracts, from the speech waveform SD, features related to values of individual speech parameters and temporal changes as sound wave feature amounts. In the emotion database ED, correspondence relation between the sound wave feature amounts and the emotions EM is defined. The emotion recognition unit 13 detects the emotion EM of the user U at the time of the utterance by collating the sound wave feature amounts extracted from the speech waveform SD with the emotion database ED.

The emotion recognition unit 13 recognizes the excitement degree of the user U on the basis of the speech waveform SD and the uttered contents. For example, the emotion recognition unit 13 extracts, from the speech waveform SD and the uttered contents, features related to an appearance frequency of a specific word appearing at the time of excitement, a speed of the utterance, and a temporal change of the fundamental frequency as incidental feature amounts. In the emotion database ED, correspondence relation between the incidental feature amounts and the excitement degree is defined. The emotion recognition unit 13 detects the excitement degree related to the emotion EM by collating the speech waveform SD and the incidental feature amounts extracted from the uttered contents with the emotion database ED.

Note that an analysis algorithm of the emotion EM and the excitement degree may be based on a specific threshold value or may be based on a learning model in which machine learning is performed. In the example of FIG. 3, the emotion EM is estimated on the basis of the fundamental frequency, signal intensity, and the speed and switching pause of the utterance. However, the emotion estimation method is not limited to the above. For example, the emotion EM may be estimated by utilization of a known emotion estimation technology such as Sensitivity Technology (ST) (by AGI. Inc.).

Figure 4:
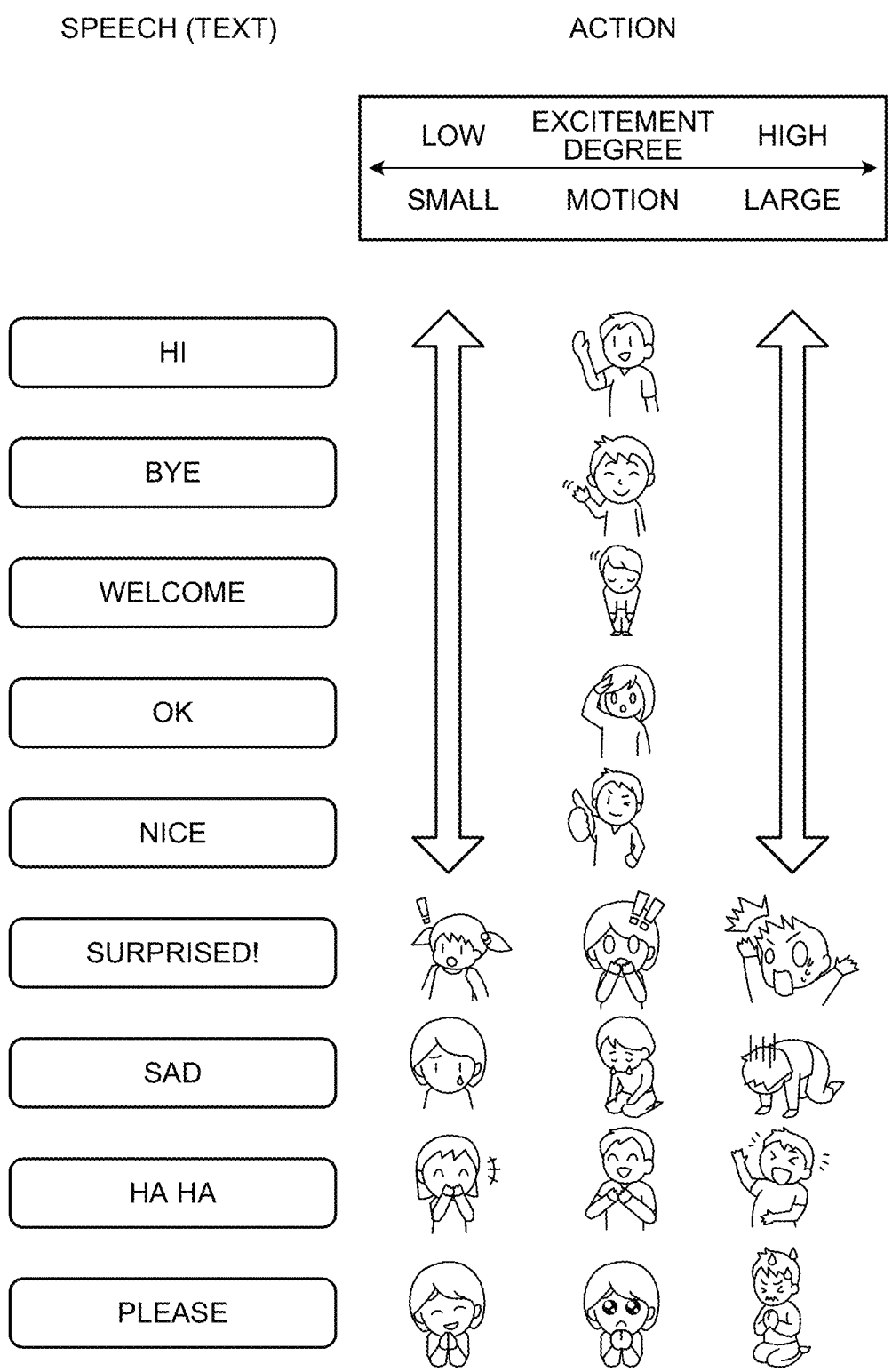
FIG. 4 is a view illustrating an example of an action recognition method.

FIG. 4 is a view illustrating an example of a recognition method of the action AC.

Examples of the actions AC recognized from the utterance "hi", "bye", "welcome", "OK", "nice", "surprised!", "sad", "ha ha", "please", and the like are illustrated in FIG. 4. The actions AC illustrated in FIG. 4 are performed unconsciously due to the emotion of the user U. For example, a gesture of raising a hand to express greeting is associated with "hi". A gesture of waving a hand to say goodbye is associated with "bye". In the gesture database JD, correspondence relation between the uttered contents and gestures is defined. The gesture recognition unit 14 collates the uttered contents with the gesture database JD, and estimates the gesture of the user U at the time of the utterance.

In the action database AD, a standard of the action (standard body motion) is defined for each gesture. In a case where the action AC does not change depending on the excitement degree, such as cases of "hi", "bye", "welcome", "OK", and "nice", the action output unit 16 outputs a standard action assigned to the gesture as the action AC of the avatar AB. In a case where the gesture changes according to the excitement degree, such as cases of "surprised!", "sad", "ha ha", and "please", the action output unit 16 adjusts the standard action assigned to the gesture according to the excitement degree.

For example, a gesture of dropping a head down and drooping is assigned to the utterance "sad". When a degree of sadness is at a standard level (excitement degree is at a standard level), a standard action in which an angle or a speed of dropping the head down becomes a standard value is output as the action AC of the avatar AB. In a case where sadness is small (excitement degree is small), an action in which an amount of drooping (angle of dropping the head down) or the speed thereof becomes smaller than the standard value is output as the action of the avatar AB. In a case where sadness is large (excitement degree is large), an action in which the amount or speed of drooping is larger than the standard value or an action of breaking down and crying is output as the action AC of the avatar AB.

In a scene in which a request is made, while only hands are put together in a case where the user is not so impatient, the action AC of lowering the head and appealing with the entire body is performed in a case where the emotion of impatient is large. In the action database AD, correspondence relation between the gestures, the excitement degree, and the actions AC is defined. The action output unit 16 collates the gesture and the excitement degree with the action database AD, and outputs the action reflecting the gesture and the excitement degree.

[3-2. Facial Expression/Action Output]

Figure 5:
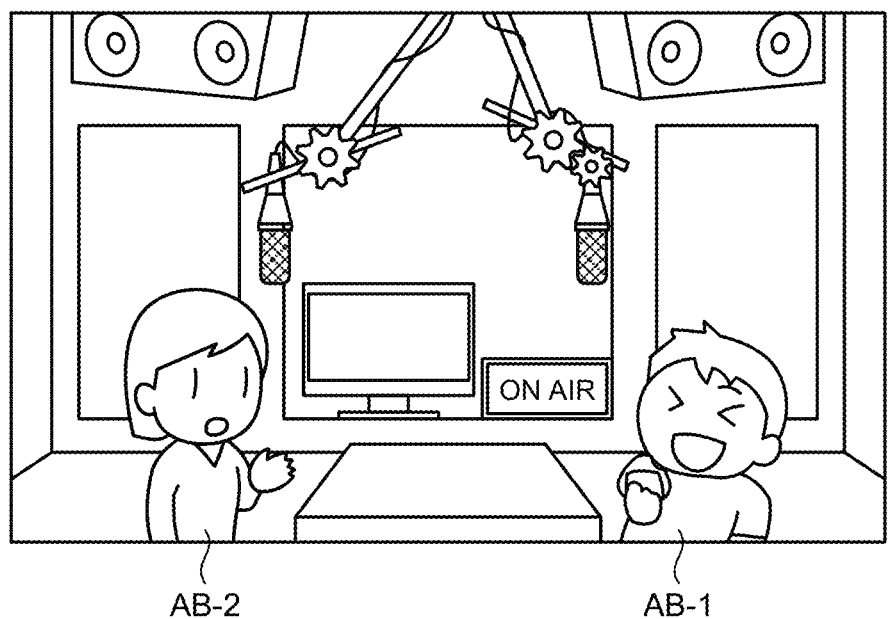
FIG. 5 is a view illustrating an example of a facial expression/action output.
Figure 6:
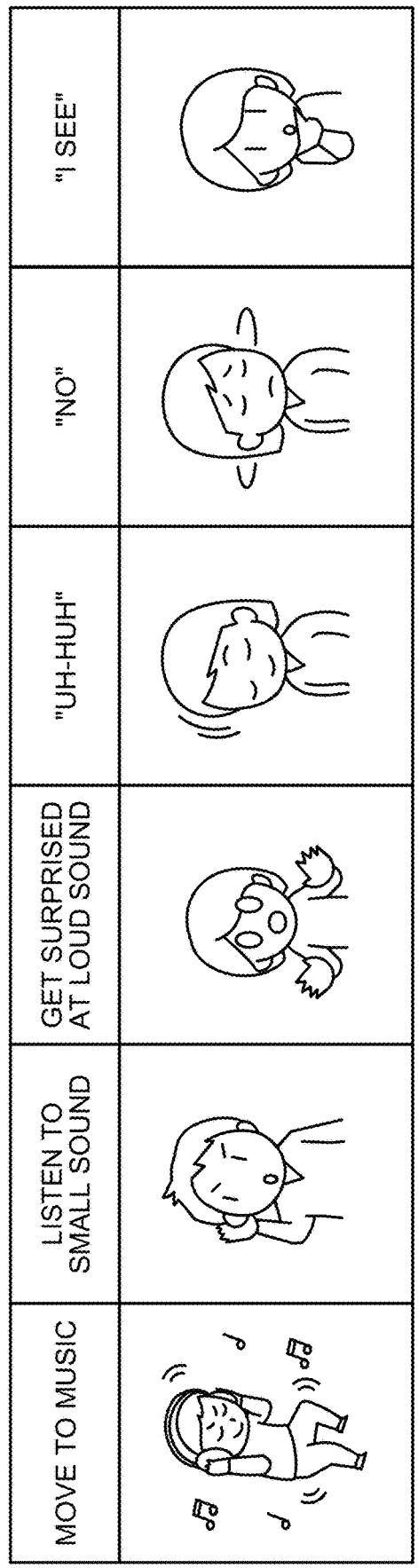
FIG. 6 is a view illustrating an example of the facial expression/action output.
Figure 7:
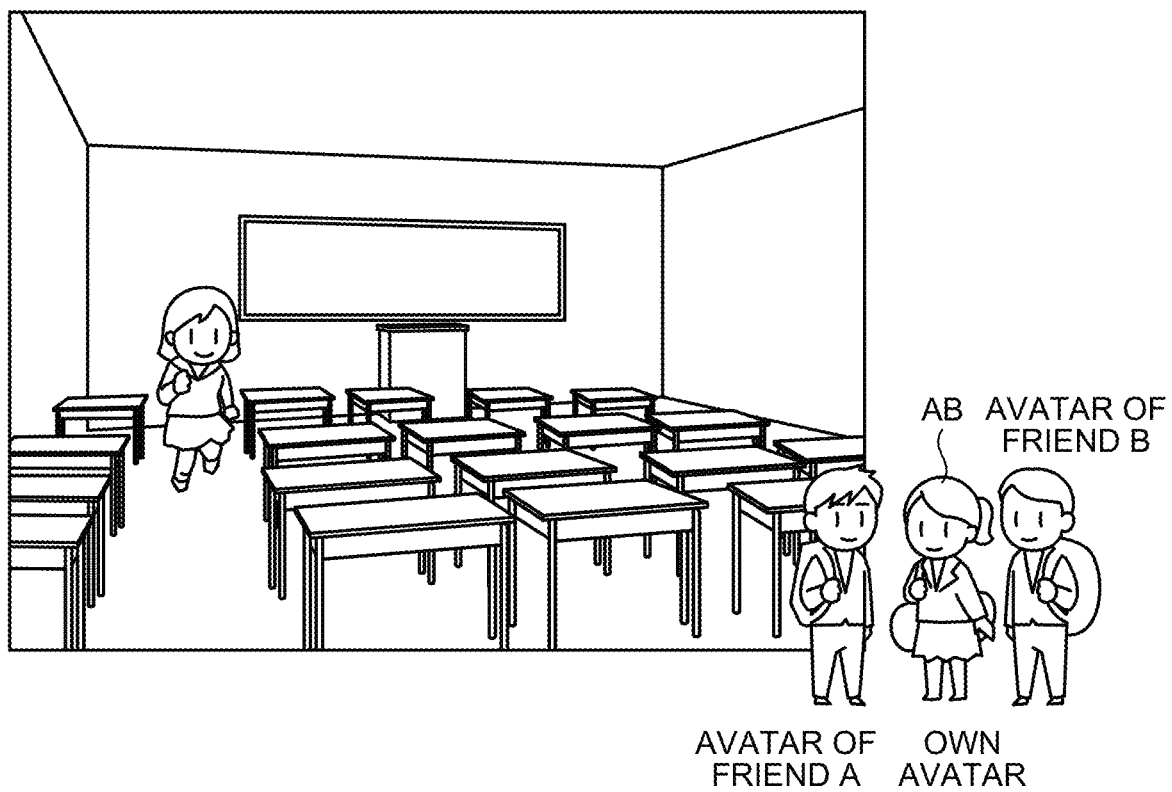
FIG. 7 is a view illustrating an example of the facial expression/action output.

FIG. 5 to FIG. 7 are views illustrating examples of the facial expression/action output.

An example of a gesture consciously performed in conjunction with utterance is illustrated in FIG. 5. In the example of FIG. 5, a user U of an avatar AB-1 utters "The rice ball is delicious" while the avatar AB-1 is having a conversation with an avatar AB-2. In conjunction with this utterance, the facial expression output unit 15 outputs the facial expression of joy, and the action output unit 16 outputs the action AC of eating the rice ball.

Another control example of the action AC of the avatar AB is illustrated in FIG. 6. For "moving to music", "listening to a small sound", and "surprised at a loud sound", the action output unit 16 estimates a scene in which an upbeat song is played, a scene in which it is difficult to hear the sound, and a scene in which a rapid volume increase is occurred on the basis of the speech waveform SD. The action output unit 16 outputs the action AC corresponding to a scene estimated on the basis of the speech waveform SD. In a case where a scene in which conversation is interrupted is detected on the basis of the speech waveform SD, the action output unit 16 can output the action AC of blinking, nodding sometimes, or the like. Note that it is also possible to perform processing of recognizing a speaker, and increasing a new avatar AB or removing a non-speaking avatar AB from the screen.

"Uh-huh", "no", and "I see" are words used as responses. The gesture database JD stores gestures corresponding to the responses. The action output unit 16 outputs standard actions corresponding to the gestures of "uh-huh", "no", and "I see" as the actions of the avatar AB.

An example in which a position of the avatar AB is moved by a speech is illustrated in FIG. 7. In the example of FIG. 7, volume of the conversation varies depending on a distance between the avatars AB. A voice of the nearby avatar AB sounds loud, and a voice of the far avatar AB sounds small. In a case where there is a partner to talk to, it is necessary to move the own avatar AB close to the avatar AB of the partner. In a case of wanting to bring his/her avatar AB closer to the avatar AB of the friend A, the user U calls a name of the friend A or utters "Talk to the friend A". The gesture recognition unit 14 recognizes a gesture indicating movement such as walking or running in response to a call or the like of the user U. The action output unit 16 outputs the action AC corresponding to the gesture such as walking or running.

Note that even when the terminal of the user U is muted, the facial expression or the action AC of the avatar AB can be controlled by the speech as long as the speech recognition processing is turned ON.

[4. Character Setting]

Figure 8:
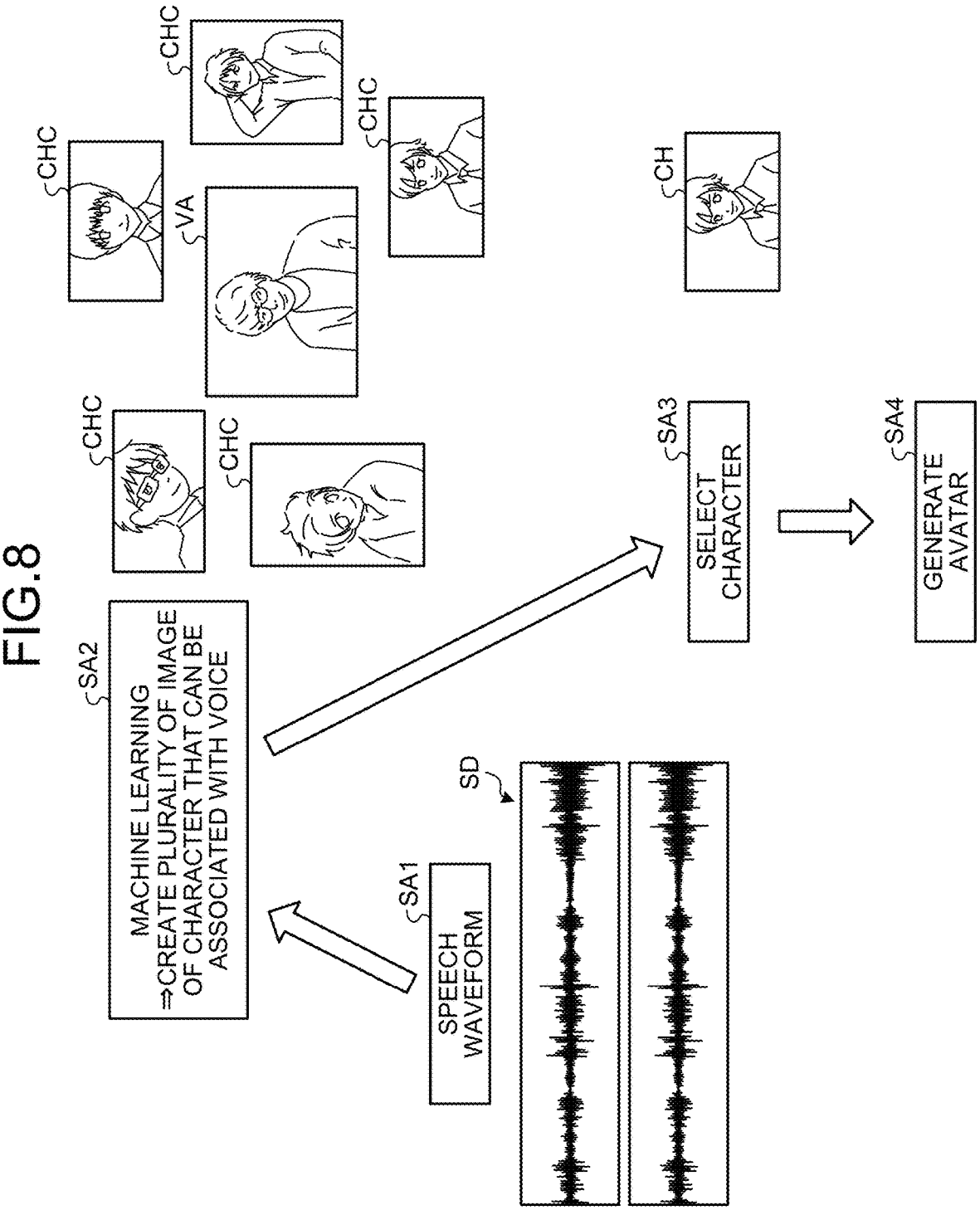
FIG. 8 is a view illustrating an example of a setting method of a character for an avatar.

FIG. 8 is a view illustrating an example of a setting method of a character CH for the avatar AB.

The character CH can be automatically selected on the basis of the speech data SG. For example, the avatar composition unit 17 estimates the character CH matching a voice quality of the user on the basis of the speech waveform SD. The avatar composition unit 17 generates the avatar AB by using data of the estimated character CH.

For example, the avatar composition unit 17 applies the speech waveform SD to a character analysis model in which speech waveforms of animation characters are learned (Step SA2). In the character analysis model, machine learning is performed in such a manner that an animation character having a voice quality similar to the speech waveform SD is output when the speech waveform SD is input.

The avatar composition unit 17 searches for one or more animation characters having a voice quality similar to the speech waveform SD as character candidates CHC. The avatar composition unit 17 uses, as the character CH for the avatar AB, the one character candidate CHC selected on the basis of the user input information (Step SA3 to SA4).

In the example of FIG. 8, a plurality of animation characters played by a voice actor VA having a voice quality similar to that of the user U are presented as the character candidates CHC. The user U can select a favorite character candidate CHC from among the one or more presented character candidates CHC. At this time, a facial expression corresponding to the speech waveform SD can be given to the character candidates CHC in such a manner that the character CH suitable for an emotion expression can be easily selected.

For example, the avatar composition unit 17 generates a facial expression corresponding to the speech waveform SD for each of the one or more retrieved character candidates CHC. The avatar composition unit 17 presents the generated facial expressions of the one or more character candidates CHC as selection targets. The user U selects one character candidate CHC as the character CH for the avatar AB from among the one or more character candidates CHC in consideration of a role that the character candidate CHC plays in the animation in such a manner that inconsistency is not generated between the emotion to be expressed and the role of the character candidate CHC. The avatar composition unit 17 generates the avatar AB by using the selected character CH.

[5. Background Setting]

Figure 9:
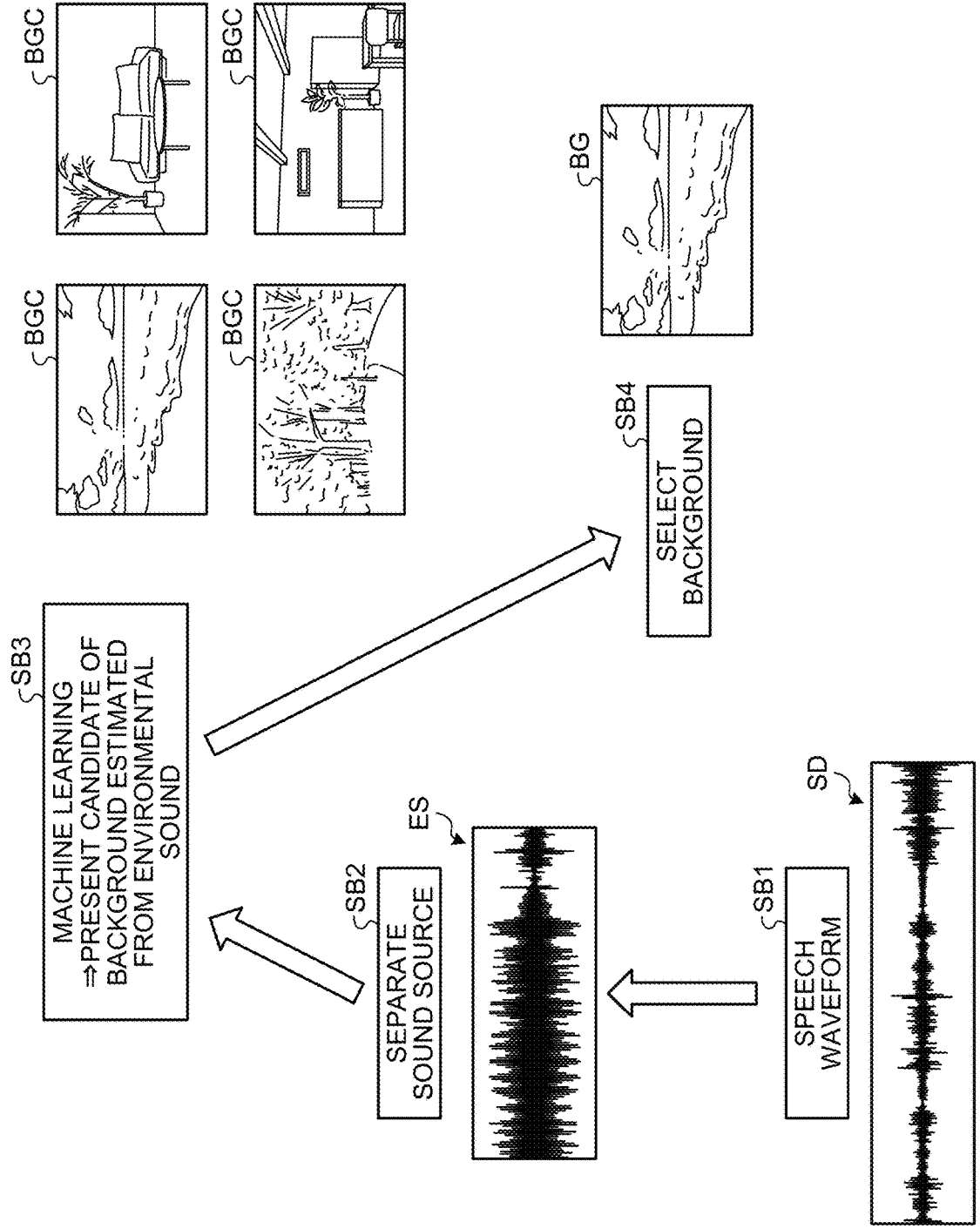
FIG. 9 is a view illustrating an example of a background setting method.

FIG. 9 is a view illustrating an example of a setting method of the background BG.

The background BG can be automatically selected on the basis of the speech data SG. For example, the background composition unit 18 extracts a waveform component indicating an environmental sound ES from the speech waveform SD. The background composition unit 18 determines the background BG on the basis of the extracted waveform component.

For example, the background composition unit 18 acquires the speech waveform SD from the speech waveform recognition unit 11 (Step SB1). The background composition unit 18 removes voice information of the user U from the speech waveform SD by using a known sound source separation technology, and extracts only a waveform component indicating the environmental sound ES (Step SB2). The background composition unit 18 applies the speech waveform SD to an environment analysis model in which correspondence relation between the environmental sound ES and environment is learned (Step SB3). In the environment analysis model, machine learning is performed to output an environment in which the environmental sound ES is generated when the environmental sound ES is input.

The background composition unit 18 searches for one or more backgrounds indicating an environment similar to the environment, in which the environmental sound ES is generated, as background candidates BGC. The background composition unit 18 uses, as the background BG for the avatar AB, one background candidate BGC selected on the basis of the user input information (Step SB4).

[6. System Configuration Example]

Figure 10:
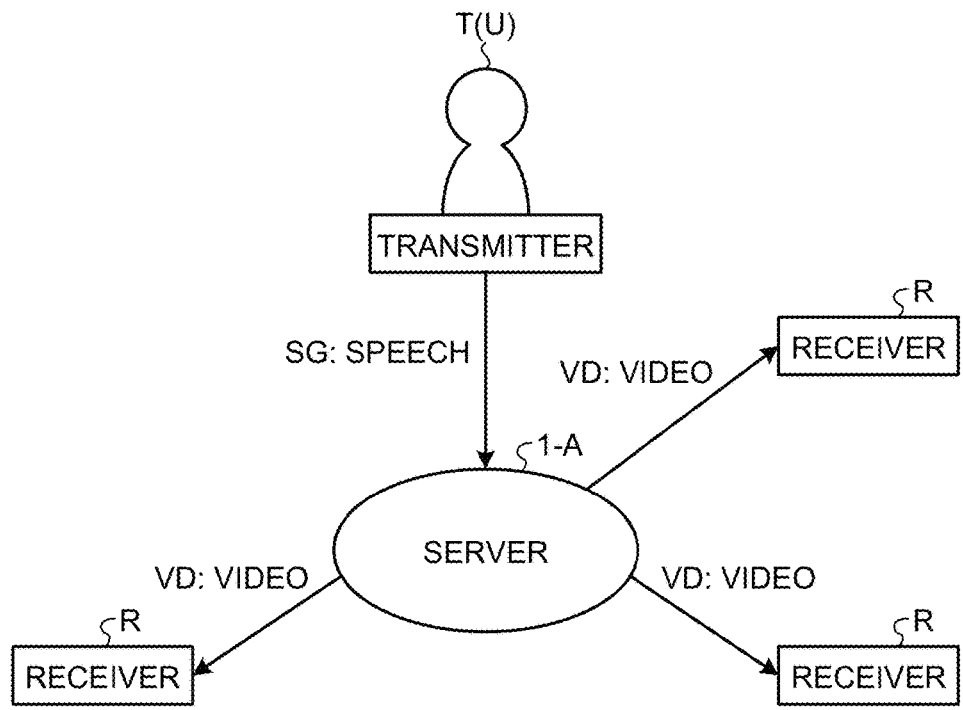
FIG. 10 is a view illustrating an example in which the communication support service is applied to one-way communication.
Figure 11:
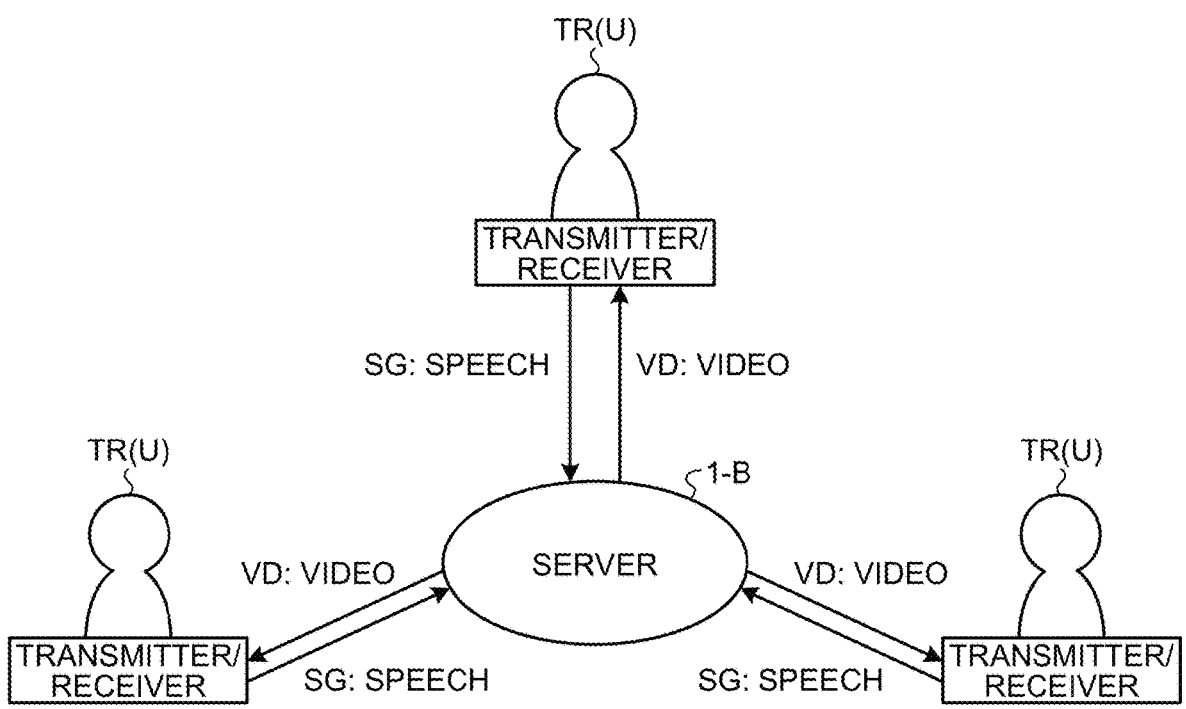
FIG. 11 is a view illustrating an example in which the communication support service is applied to two-way communication.

FIG. 10 and FIG. 11 are views illustrating system configuration examples of the communication support service. FIG. 10 is a view illustrating an example in which the communication support service is applied to one-way communication. FIG. 11 is a view illustrating an example in which the communication support service is applied to two-way communication.

The communication support service can be applied to both the one-way communication and the two-way communication. In the example of FIG. 10, the user U as a transmitter T transmits the speech data SG to an information processing device 1-A (server), and controls the facial expression and action of the avatar AB. The information processing device 1-A transmits the video VD including the avatar AB of the transmitter T to a receiver R. In the example of FIG. 11, individual users U connected to an information processing device 1-B (server) are the transmitters T and the receivers R.

In the example of FIG. 11, each of transmitters/receivers TR can prevent the own speech data SG from being transmitted to the other transmitters/receivers TR by mute setting. For example, the user U can distribute the video VD not including the speech data SG by turning the mute setting ON. Even in a case where the mute setting is ON, the terminal of the user U transmits the speech data SG acquired by a microphone to the information processing device 1-B. On the basis of the received speech data SG, the information processing device 1-B controls the facial expression and action of the avatar AB of the user U who makes the mute setting turned ON. As a result, it is possible to appropriately control the facial expression and action of the avatar AB without distributing the speech data to another person.

For example, in a web conference or the like, there is a case where the user U who is not scheduled to speak turns OFF a speech transmission function on the app and performs setting of a state of only listening to contents of the conference (mute setting: ON) in order to prevent his/her voice from being distributed in the conference by mistake. In this case, when the microphone (voice reception function) is completely turned OFF, the facial expression and action of the avatar AB cannot be controlled. Thus, even in a case where the mute setting is ON, the terminal of the user U turns ON the microphone and transmits speech acquired by the microphone to the information processing device 1-B. Although generating the avatar AB of the user U on the basis of the received speech data SG and distributing the video VD, the information processing device 1-B does not distribute the speech data SG itself to the other transmitters/receivers TR. As a result, it is possible to control the avatar AB while preventing erroneous transmission of the speech.

[7. Hardware Configuration Example]

Figure 12:
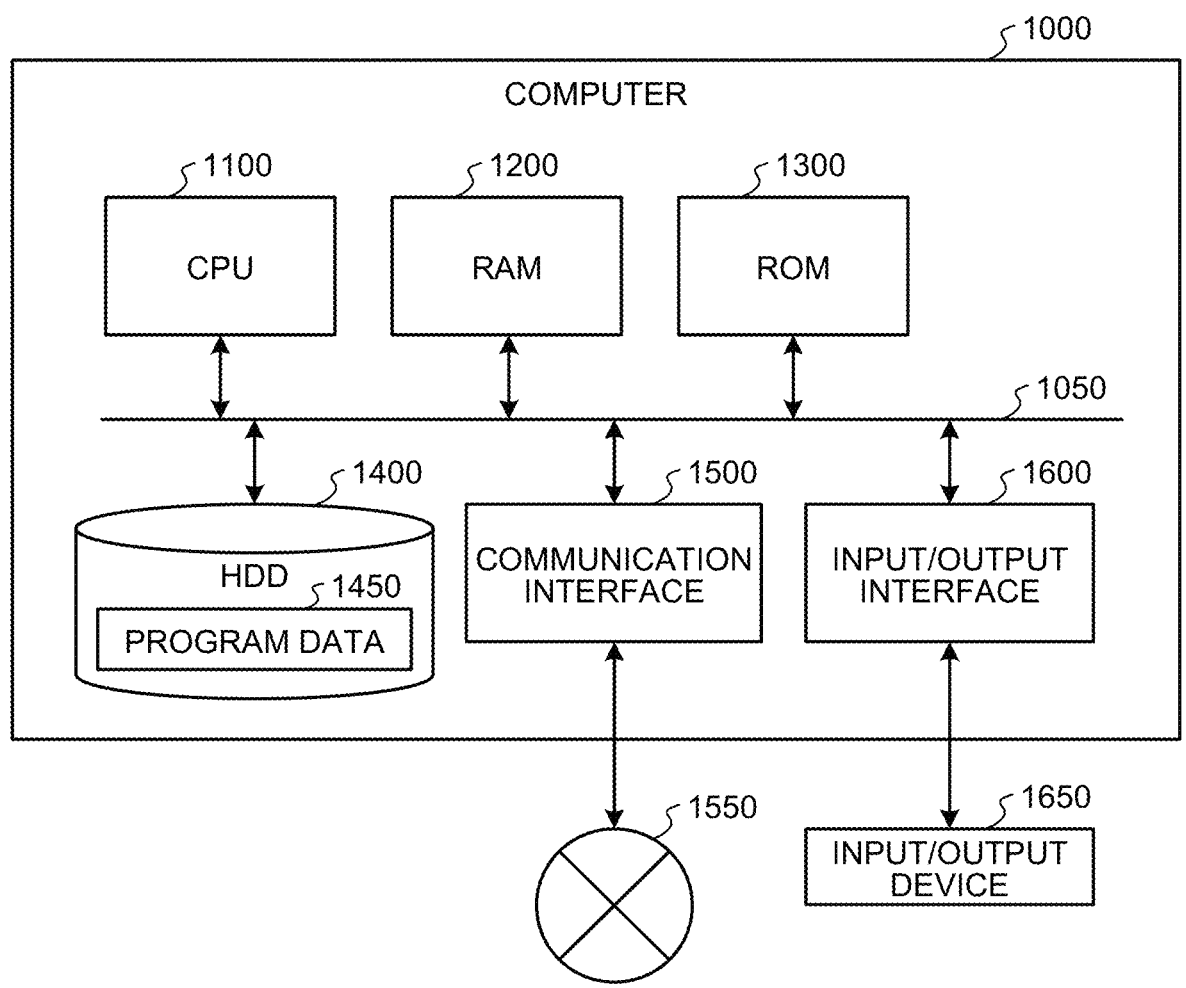
FIG. 12 is a view illustrating a hardware configuration example of the information processing device.

FIG. 12 is a view illustrating a hardware configuration example of the information processing device 1. For example, the information processing device 1 is realized by a computer 1000. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of programs stored in the ROM 1300 or the HDD 1400, and controls each unit. For example, the CPU 1100 expands the programs, which are stored in the ROM 1300 or the HDD 1400, in the RAM 1200 and executes processing corresponding to the various programs.

The ROM 1300 stores a boot program such as a basic input output system (BIOS) executed by the CPU 1100 during activation of the computer 1000, a program that depends on hardware of the computer 1000, and the like.

The HDD 1400 is a computer-readable recording medium that non-temporarily records the programs executed by the CPU 1100, data used by the programs (including various databases), and the like. Specifically, the HDD 1400 is a recording medium that records an information processing program according to the present disclosure which program is an example of program data 1450.

The communication interface 1500 is an interface for the computer 1000 to connect to an external network 1550 (such as the Internet). For example, via the communication interface 1500, the CPU 1100 receives data from another device or transmits data generated by the CPU 1100 to another device.

The input/output interface 1600 is an interface to connect an input/output device 1650 and the computer 1000. For example, the CPU 1100 receives data from an input device such as a keyboard or mouse via the input/output interface 1600. Furthermore, the CPU 1100 transmits data to an output device such as a display, a speaker, or a printer via the input/output interface 1600. Furthermore, the input/output interface 1600 may function as a medium interface that reads a program or the like recorded on a predetermined recording medium (medium). The medium is, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing device 1, the CPU 1100 of the computer 1000 realizes the above-described various functions by executing the programs loaded on the RAM 1200. In addition, the HDD 1400 stores a program for causing the computer to function as the information processing device 1. Note that the CPU 1100 reads the program data 1450 from the HDD 1400 and performs execution thereof. However, these programs may be acquired from another device via the external network 1550 in another example.

[8. Effect]

The information processing device 1 includes the emotion recognition unit 13, the facial expression output unit 15, and the avatar composition unit 17. The emotion recognition unit 13 recognizes the emotion EM on the basis of the speech waveform SD. The facial expression output unit 15 outputs a facial expression corresponding to the emotion EM. The avatar composition unit 17 composes the avatar AB showing the output facial expression. In the information processing method of the present disclosure, processing of the information processing device 1 is executed by the computer 1000. The program of the present disclosure causes the computer 1000 to realize the processing of the information processing device 1.

According to this configuration, the facial expression of the avatar AB can be controlled by utilization of the tone. Thus, it is possible to cause the avatar AB to express richer emotions compared to a case where a facial expression is generated by motion capturing.

The emotion recognition unit 13 recognizes the excitement degree on the basis of the speech waveform SD and the uttered contents. The facial expression output unit 15 outputs the facial expression reflecting the excitement degree.

According to this configuration, internal information that is the excitement is better reflected in the facial expression.

The information processing device 1 includes the gesture recognition unit 14 and the action output unit 16. The gesture recognition unit 14 recognizes a gesture on the basis of the uttered contents. The action output unit 16 outputs the action AC of the avatar AB which action corresponds to the gesture.

According to this configuration, the emotion EM of the user U is more easily reflected in the motion of the avatar AB compared to a case where the motion is generated by motion capturing. Since the emotion EM of the user is reflected in both the facial expression and the action AC, it becomes possible to express rich emotions.

The action output unit 16 outputs the action AC reflecting the excitement degree.

According to this configuration, the internal information that is the excitement is better reflected in the action AC.

The action output unit 16 outputs the action AC corresponding to a scene estimated on the basis of the speech waveform SD.

According to this configuration, it is possible to cause the avatar AB to perform the appropriate action AC corresponding to the scene.

The information processing device 1 includes the background composition unit 18. The background composition unit 18 composes the background BG corresponding to the scene estimated on the basis of the speech waveform SD or the uttered contents.

According to this configuration, a video of the background BG can be changed by the speech.

The background composition unit 18 extracts a waveform component indicating the environmental sound ES from the speech waveform SD, and determines the background BG on the basis of the extracted waveform component.

According to this configuration, the environment serving as the background BG is reproduced with high accuracy.

The background composition unit 18 searches for one or more backgrounds indicating an environment similar to the environment, in which the environmental sound ES is generated, as background candidates BGC. The background composition unit 18 uses, as the background for the avatar AB, one background candidate BGC selected on the basis of the user input information.

According to this configuration, the appropriate background BG reflecting the preference of the user U is selected.

The avatar composition unit 17 generates the avatar AB by using the data of the character CH estimated on the basis of the speech waveform SD.

According to this configuration, the avatar AB suitable for the voice quality of the user U is provided.

The avatar composition unit 17 searches for one or more animation characters having a voice quality similar to the speech waveform SD as character candidates CHC. The avatar composition unit 17 uses, as the character CH for the avatar AB, the one character candidate CHC selected on the basis of the user input information.

According to this configuration, a favorite animation character matching the voice quality of the user U is used as the avatar AB.

The avatar composition unit 17 generates a facial expression corresponding to the speech waveform SD for each of the one or more retrieved character candidates CHC. The avatar composition unit 17 presents the generated facial expressions of the one or more character candidates CHC as selection candidates.

According to this configuration, it becomes easy to select the character CH suitable for the emotion expression.

The information processing device 1 includes the video output unit 19. The video output unit 19 outputs the video VD including the avatar AB. In a case where the mute setting is OFF, the video output unit 19 outputs the speech data SG, from which the speech waveform SD is extracted, in a manner of being included in the video VD. In a case where the mute setting is ON, the video output unit 19 outputs the video VD not including the speech data SG.

According to this configuration, by turning ON the mute setting, it is possible to appropriately control the facial expression and action of the avatar AB without distributing the speech data SG to the others.

Note that the effects described in the present description are merely examples and are not limitations, and there may be another effect.

SUPPLEMENTARY NOTE

Note that the present technology can also have the following configurations.

(1)

An information processing device including:
  an emotion recognition unit that recognizes an emotion on the basis of a speech waveform;
  a facial expression output unit that outputs a facial expression corresponding to the emotion; and an avatar composition unit that composes an avatar showing the facial expression.

(2)

The information processing device according to (1), in which
  the emotion recognition unit recognizes an excitement degree on the basis of the speech waveform and uttered contents, and
  the facial expression output unit outputs the facial expression reflecting the excitement degree.

(3)

The information processing device according to (2), further including:
  a gesture recognition unit that recognizes a gesture on the basis of the uttered contents; and
  an action output unit that outputs an action of the avatar which action corresponds to the gesture.

(4)

The information processing device according to (3), in which
  the action output unit outputs the action reflecting the excitement degree.

(5)

The information processing device according to (3) or (4), in which
  the action output unit outputs the action corresponding to a scene estimated on the basis of the speech waveform.

(6)

The information processing device according to any one of (1) to (5), further including
  a background composition unit that composes a background corresponding to a scene estimated on the basis of the speech waveform or uttered contents.

(7)

The information processing device according to (6), in which
  the background composition unit extracts a waveform component indicating an environmental sound from the speech waveform, and determines the background on the basis of the extracted waveform component.

(8)

The information processing device according to (7), in which
  the background composition unit searches for one or more backgrounds indicating an environment similar to an environment, in which the environmental sound is generated, as background candidates, and uses one background candidate selected on the basis of user input information as the background for the avatar.

(9)

The information processing device according to any one of (1) to (8), in which the avatar composition unit generates the avatar by using data of a character estimated on the basis of the speech waveform.

(10)

The information processing device according to (9), in which the avatar composition unit searches for one or more animation characters having a voice quality similar to the speech waveform as character candidates, and uses one character candidate selected on the basis of user input information as a character for the avatar.

(11)

The information processing device according to (10), in which the avatar composition unit generates a facial expression corresponding to the speech waveform for each of the one or more retrieved character candidates, and presents the generated facial expressions of the one or more character candidates as selection candidates.

(12)

The information processing device according to any one of (1) to (11), further including a video output unit that outputs a video including the avatar, in which the video output unit outputs the video including speech data from which the speech waveform is extracted in a case where mute setting is OFF, and outputs the video not including the speech data in a case where the mute setting is ON.

(13)

An information processing method executed by a computer, the method including:

recognizing an emotion on the basis of a speech waveform;

outputting a facial expression corresponding to the emotion; and composing an avatar showing the facial expression.

(14)

A program for causing a computer to realize:

recognizing an emotion on the basis of a speech waveform;

outputting a facial expression corresponding to the emotion; and composing an avatar showing the facial expression.

REFERENCE SIGNS LIST

1 INFORMATION PROCESSING DEVICE
13 EMOTION RECOGNITION UNIT
14 GESTURE RECOGNITION UNIT
15 FACIAL EXPRESSION OUTPUT UNIT
16 ACTION OUTPUT UNIT
17 AVATAR COMPOSITION UNIT
18 BACKGROUND COMPOSITION UNIT
19 VIDEO OUTPUT UNIT
AB AVATAR
AC ACTION
BG BACKGROUND
BGC BACKGROUND CANDIDATE
CH CHARACTER
CHC CHARACTER CANDIDATE
EM EMOTION
ES ENVIRONMENTAL SOUND
SD SPEECH WAVEFORM

The invention claimed is:

1. An information processing device comprising:
circuitry including a CPU that is configured to
recognize an emotion based on a speech waveform;
output a facial expression corresponding to the emotion;
compose an avatar showing the facial expression; and
compose a background corresponding to a scene estimated based on the speech waveform or uttered contents, wherein
the circuitry is further configured to
extract a waveform component indicating an environmental sound from the speech waveform; and
determine the background based on the waveform component.

2. The information processing device according to claim 1, wherein
the circuitry is further configured to
recognize an excitement degree based on the speech waveform and the uttered contents; and
output the facial expression reflecting the excitement degree.

3. The information processing device according to claim 2, wherein
the circuitry is further configured to recognize a gesture based on the uttered contents; and
output an action of the avatar which action corresponds to the gesture.

4. The information processing device according to claim 3, wherein
the circuitry is further configured to output the action reflecting the excitement degree.

5. The information processing device according to claim 3, wherein
the circuitry is further configured to output the action corresponding to a scene estimated based on the speech waveform.

6. The information processing device according to claim 1, wherein
the circuitry is further configured to
search for one or more background candidates indicating an environment similar to an environment in which the environmental sound is generated; and
use one background candidate selected based on user input information as the background for the avatar.

7. The information processing device according to claim 1, wherein
the circuitry is further configured to generate the avatar by using data of a character estimated based on the speech waveform.

8. The information processing device according to claim 7, wherein
the circuitry is further configured to
search for one or more character candidates having a voice quality similar to the speech waveform; and
use one character candidate selected based on user input information as the character for the avatar.

9. The information processing device according to claim 8, wherein
the circuitry is further configured to
generate a facial expression corresponding to the speech waveform for each of the one or more character candidates; and
present facial expressions of the one or more character candidates as selection targets.

10. The information processing device according to claim 1, wherein
the circuitry is further configured to output a video including the avatar, wherein the video includes speech data from which the speech waveform is extracted in a case where mute setting is OFF, and the video does not include the speech data in a case where the mute setting is ON.

11. An information processing method executed by a computer, the method comprising:
 recognizing an emotion based on a speech waveform;
 outputting a facial expression corresponding to the emotion;
 composing an avatar showing the facial expression; and
 composing a background corresponding to a scene estimated based on the speech waveform or uttered contents, wherein
 the method further comprises
  extracting a waveform component indicating an environmental sound from the speech waveform; and
  determining the background based on the waveform component.

12. A non-transitory computer-readable storage medium storing a program for causing a computer to perform processing comprising:
 recognizing an emotion based on a speech waveform;
 outputting a facial expression corresponding to the emotion; and
 composing an avatar showing the facial expression by using data of a character estimated based on the speech waveform, wherein
 the processing further comprises
  searching for one or more character candidates having a voice quality similar to the speech waveform; and
  using one character candidate selected based on user input information as the character for the avatar.

\* \* \* \* \*